Feb. 20, 1923.
J. NIEMIEC ET AL
1,446,316
PROCESS OF MANUFACTURING TEXTILES AND ARTICLES OF MANUFACTURE
Filed Mar. 22, 1922
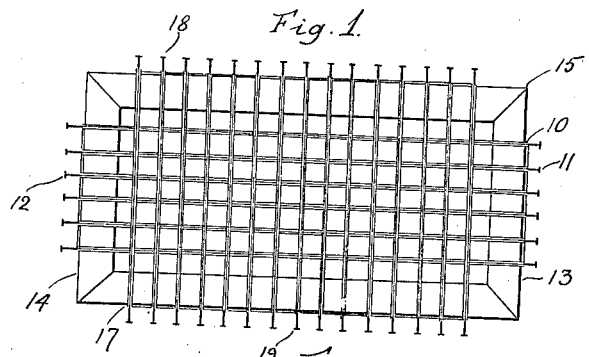
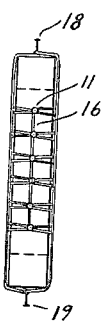
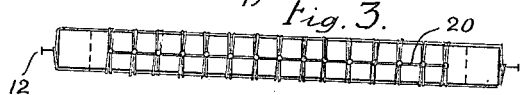
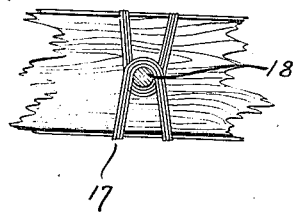
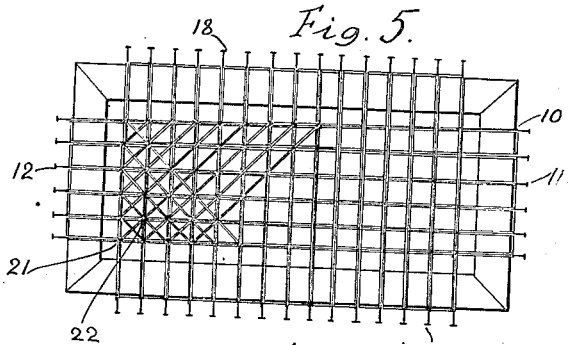
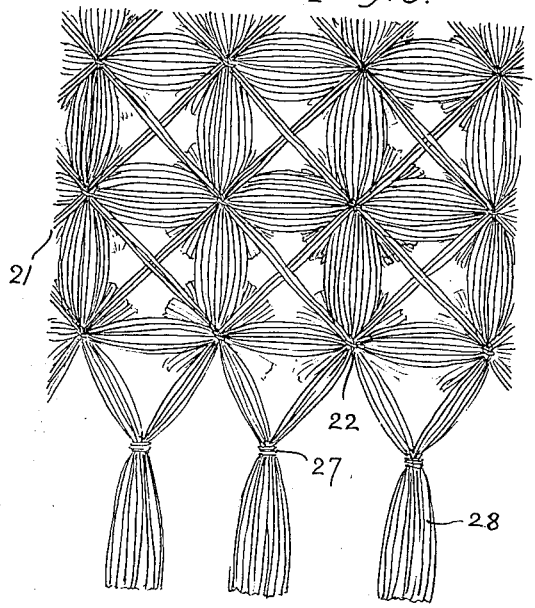
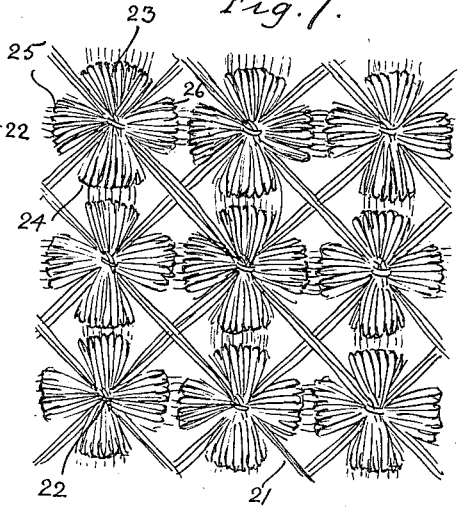
INVENTORS
Joseph Niemiec
Walenty Zdunek
BY
George C. Heiuner
ATTORNEY Patented Feb. 20, 1923.

1,446,316

UNITED STATES PATENT OFFICE.

JOSEPH NIEMIEC AND WALENTY ZDUNEK, OF NEWARK, NEW JERSEY.

PROCESS OF MANUFACTURING TEXTILES AND ARTICLES OF MANUFACTURE.

Application filed March 22, 1922. Serial No. 545,693.

*To all whom it may concern:*

Be it known that I, JOSEPH NIEMIEC, a citizen of Poland, residing at Newark, county of Essex and State of New Jersey, and I, WALENTY ZDUNEK, a citizen of the United States, residing at Newark, county of Essex, and State of New Jersey, have invented certain new and useful Improvements in Processes of Manufacturing Textiles and Articles of Manufacture, of which the following is a specification.

The object of the invention is a new method of making fancy goods, such as blankets, shawls, table covers or the like, and the articles produced by this method.

It is the principal object of the invention to provide a textile fabric of this character which can be quickly made by any unskilled workman and which is extremely simple and inexpensive while it produces a highly ornamental fabric.

Another object of the invention is to provide a new process of manufacture of making fancy goods by hand and cutting any part of the strands thereafter for forming fancy rosettes or the like.

These and other objects of the invention will become more fully apparent as the description thereof proceeds, and will then be more particularly pointed out in the appended claims.

In the accompanying drawing forming a material part of this disclosure:

Figure 1 shows a frame used in the practical execution of my method in front view.

Figure 2 is an end view thereof.

Figure 3 is a top plan view of the frame.

Figure 4 is a fragmentary enlarged view illustrating the manner of guiding the strands over the top edge of the frame, on an enlarged scale.

Figure 5 is a view similar to Figure 1, illustrating the manner of connecting the single strands.

Figure 6 shows part of the finished fabrics in rear view, and

Figure 7 is a front view of part of the fabric made according to the new method after formation of the rosettes.

Our method consists in general in winding a strand 10 of wool, silk or any other suitable material around a plurality of nails 11 and 12 or the like, secured on the side edges 13 and 14 of an open frame 15, on one side of this frame going forth, back and then forth again. The connection of the strand with the next adjoining nail 11 or 12, as the case may be, is indicated at 16. Then this operation is repeated on the other side of the frame, the end of the strand being tied to the last nail. When by this operation the horizontal layers or loops of strands are formed on both sides of the frame, in the same manner then the vertical layers are formed by winding the strands 17 around the nails 18 and 19 on the top or bottom edge of the frame and going from nail to nail as indicated at 20.

Then diagonal strands or threads, 21 preferably of a different color, are formed by tying or knotting the strands at their points of intersection of the horizontal and the vertical strands simultaneously on both sides of the frame as indicated at 22, starting from one corner of the frame or the other, and going from one row of horizontal or vertical strands to the other by following these strands. This operation connects all the vertical and horizontal strands on both sides of the frame from one side of the same simultaneously at their points of intersection. Then the threads forming the horizontal and vertical strands on one side of the frame are cut as indicated at 23, 24, 25 and 26 respectively, so that the strands, on account of the knots will spread in the manner indicated, and will form rosettes. The fabric is then cut along the upper and the lower and side edges of the frame and laterally taken out of the frame and two adjoining strands of the vertical or horizontal rows of strands are joined as indicated at 27 to form tassels 28.

As result of our method a fabric is formed presenting a highly ornamented front and rear face, especially if various multi-colored strands are used in alternation.

Having thus described our invention, what we claim as new and desire to protect by Letters Patent of the United States is—

1. A method of weaving fabrics consisting in forming a thread into a series of horizontal and vertical loops, connecting the horizontal and vertical loops at their points of intersection by diagonal threads, cutting the horizontal and vertical loops near their points of intersection on one side of the fabric cutting the loops along their upper, lower and side edges, and forming tassels at the ends of the strands formed by said cutting operation.

2. A method of weaving fabrics by hand consisting in forming a thread around an open frame into a series of horizontal and vertical loops, connecting the horizontal and vertical loops at their points of intersection by knotting diagonal strands of a different color to said loops going from one row of strands to the other along the vertical and horizontal loops, cutting the horizontal and vertical strands on one side of the fabric near their points of intersection, cutting the loops along the upper, lower and side edges of the frame, and knotting the loose ends of two adjoining vertical and horizontal strands to form tassels.

3. The method of weaving fabrics of the class described consisting in forming on an open frame a series of rows of horizontal and vertical intersecting loops, on both sides of the frame leaving an open space between two rows of loops, connecting the points of intersection of the horizontal and vertical rows on both sides of the frame simultaneously by knotting diagonal strands around the points of intersection, carrying said diagonal strands from one row to the other along said series of loops, cutting the horizontal and vertical strands on one side of the fabric near their points of intersection to form rosettes on one face of the fabric, cutting the loops along the longitudinal and lateral edges of the frame, removing the fabric sidewise from the frame, and knotting two adjoining strand ends formed by this cutting operation together to form tassels.

4. As an article of manufacture a fabric comprising intersecting vertical and horizontal rows of strands, and diagonal strands connecting the points of intersection, rosettes formed by cutting the strands near their points of intersection, and tassels formed at the ends of the fabric.

5. In a knitting and weaving device of the class described, the combination of an open frame, with a plurality of nails secured in the upper, lower and side edges of said frame adapted to allow the winding of fabric strands around the nails to form intersecting loops.

In testimony whereof we have affixed our signatures.

JOSEPH NIEMIEC.
WALENTY ZDUNEK.